UNITED STATES PATENT OFFICE.

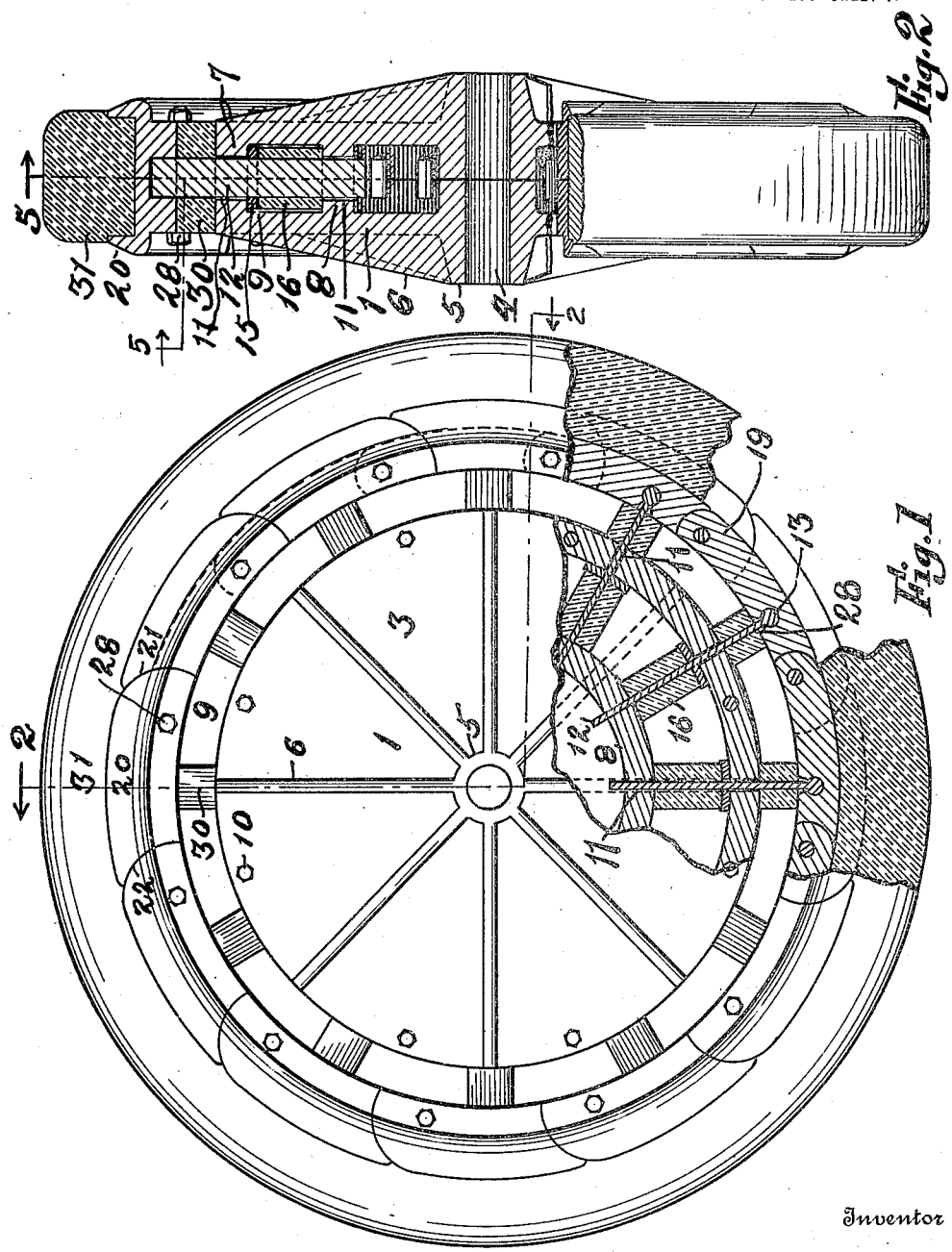

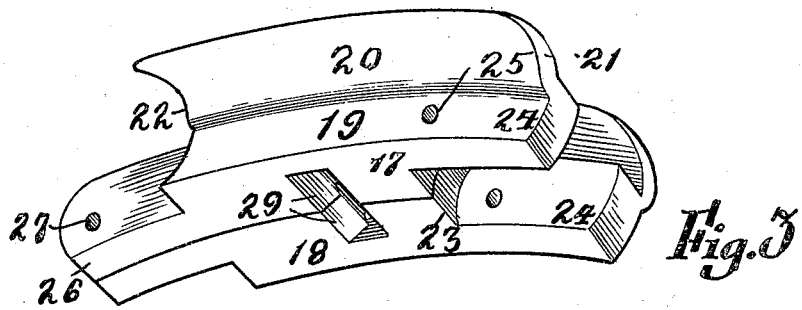
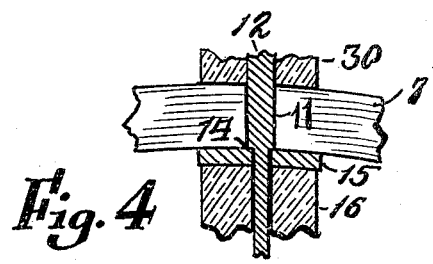
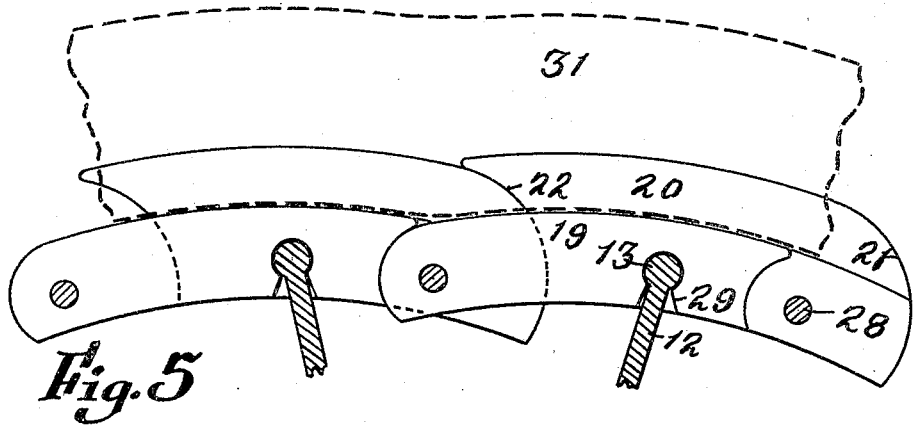
Inventor
Warren H. Hines,
By
Q. E. Humphrey
Attorney

WARREN H. HINES, OF FLINT, MICHIGAN, ASSIGNOR OF FORTY-NINE ONE-HUNDREDTHS TO ELLEN V. HINES, OF FLINT, MICHIGAN.

VEHICLE-WHEEL.

1,398,265.　　　　　Specification of Letters Patent.　　Patented Nov. 29, 1921.

Application filed March 24, 1919.　Serial No. 284,826.

*To all whom it may concern:*

Be it known that I, WARREN H. HINES, a citizen of the United States, residing at Flint, in the county of Genesee and State of Michigan, have invented new and useful Improvements in Vehicle-Wheels, of which the following is a specification.

This invention has relation to improvements in the construction of vehicle wheels and has more especial relation to the construction of wheels intended for heavy vehicles such as trucks having the rim portions thereof equipped with elastic tires. The object of the invention is to provide a vehicle wheel having means for seating a resilient tire thereon, the means comprising a rim formed by a plurality of associated interlocking interengaging and radially movable segment-shaped sections, the outer faces of which are in alinement circumferentially to furnish a tire seat and furthermore embodying a pair of opposing lateral disk-like plates, each provided with a pair of spaced, circumferentially extending, concentric flanges. Coöperating with the rim sections and extending inwardly from each section is a loose spoke which is pivotally connected with one of the rim sections and extends inwardly and radially through both rings. Each spoke is provided with a collar adapted to normally abut against the inner circumferential face of the outer of said concentric flanges so as to limit the outward radial movement of the spoke. Interposed between each rim forming section and the outer ring or flange and inclosing each spoke is a tubular body of resilient or cushioning material such as vulcanized rubber which is arranged to be distorted to constitute a cushion for preventing movement of each rim forming section inwardly toward the outer ring or flange carried by the side disks or plates. Surrounding each spoke between the two rings is a tubular body of resilient material such as vulcanized rubber and which is adapted to be engaged by the abutment carried by the spoke which it surrounds. By this provision a double cushion is provided for the inward radial movement of each of rim forming sections, the normal effect of the cushioning material being to force the segment-shaped section of the rim outwardly when not forced inwardly by pressure due to service conditions.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a side elevation of a vehicle wheel embodying the present invention with portions thereof broken away to better illustrate the construction thereof.

Fig. 2 is a sectional view taken on the line 2—2 of Fig. 1.

Fig. 3 is a perspective view of a part of the rim forming sections.

Fig. 4 is an enlarged sectional view showing a spoke and associated parts, and

Fig. 5 is a section taken on line 5—5 of Fig. 2.

A wheel forming the subject matter of the present invention embodies two oppositely-disposed disk-like plates 1 and 2 constructed identically alike and hence it is thought a description of one will be sufficient for the understanding of both. Each plate consists of a circular body portion 3 provided with a central aperture 4 about which is a hub flange 5 the two apertures 4 adapted to register with each other to enable them to receive an axle. Extending from the hub flange 5 to approximately the periphery of the plate are radiating webs or ribs 6 for strengthening purposes only. In practice the ribs 6 will preferably be integral not only with the body portion 3 but also with the hub flange 5. Each plate is provided on its abutting face with a pair of circumferentially extending concentrically arranged flanges 7 and 8 which project therefrom in spaced parallel relation. The flange 7 is positioned on each of said disks with its outer circumferential edge coextensive with the peripheral edge thereof and the flanges of the opposing plates are adapted to register and lie in contact when the device is assembled. The flanges 7 constitute the outer face of the fixed portion of the wheel. The inner opposing faces of the plates 1 and 2 are furthermore provided with circumferential flanges 8 which are adapted to register and to contact when the device is assembled and these flanges 8 are spaced from the flanges 7 to provide an annular chamber 9. When the device is assembled the outer flanges constitute a ring and will be so designated in the future description and the inner flanges 8 when the device is assembled constitute an inner ring these terms being used for brevity. Extending through suitable openings in the two members 1 and 2 and preferably extending through the ring 7 are clamping bolts 10 for drawing the two members 1 and 2 together and holding them in assembled relation. The two rings 7 and 8 are provided with radially alined openings 11 in each pair of which is mounted a loose spoke 12. These spokes being all similar the description will be confined to one spoke. The outwardly projecting end of each spoke is provided with a cylindrical head 13 and the spoke is further provided with a shoulder 14 (see Fig. 4) against which is fixed a collar 15 which is adapted to normally abut against the inner circumferential face of the flange 7. The inner ends of the spokes project into the space inclosed by the inner ring 8 and are free to move therein. Positioned between the inner ring 8 and the abutment 14 and surrounding each spoke is a tubular body 16 of cushioning material such as vulcanized rubber, for a purpose to be later described.

The rim portion of the wheel is formed of a plurality of associated, connected, interengaging, interlocking, segment-shaped sections and as they are all similar the description will be confined to a single member, reference being especially directed to Fig. 3. Each section comprises a pair of complemental members 17 and 18 both similar and each consisting of a body portion 19 the outer portions of which are provided with a rim forming portion 20, one end 21 of each of which is convex and the opposite end 22 concave so that when two sections are associated their edges form a movable joint to permit each member to rock radially. Each member of each section is provided with a cutaway portion at 23 and to provide an offset projecting lug 24 and these lugs 24 are provided with apertures 25 in alinement transversely. The opposite end of each body portion 19 is provided with a projecting tongue 26 and are both provided with apertures 27 in alinement with each other when the two members are associated together. The transverse width of the combined tongues 26 is such as to permit them to be easily receivable in the recess formed by the separated lugs 24 and form therewith a hinge joint with the apertures 27 in alinement with the apertures 25 to receive pivot bolts 28. The inner faces of the body portions of the two members 17 and 18 are provided with alined recesses 29 of appropriate formation to receive the head 13 of one of the spokes 12 and permit free movement of the section during the use of the wheel. The movement of the sections is illustrated in so far as the drawings can illustrate it in Fig. 5 wherein it is shown that under service conditions each section is free to rock radially and as each section is forced inwardly due to the weight of the load on the vehicle the respective spoke attached to the section which engages the roadway will be forced inwardly. In order to further cushion the movement of the sections there is positioned around each of the spokes between one of the sections and the outer face of the ring 7, a tubular body 30 of cushioning material such as vulcanized rubber. As the section is moved inwardly as before stated the body of rubber 30 is distorted and the inward movement of the spoke is further resisted and the movement cushioned by the body of rubber 16 interposed between the abutment 15 and the outer face of the inner ring 8, the two bodies of rubber 16 and 30 constituting a double cushioning medium for the wheel. The outwardly extending flanges 21 of the rim forming sections constitute holding means for a cushioning tire 31 which may be of any preferred construction and may be secured in position by any appropriate or preferred means. In ordinary practice the drawing up of the bolts 28 which constitute the pivots used for connecting the various sections of the rim portion of the device will serve to clamp the tire 31 in place sufficiently to hold it against either circumferential movement or displacement.

I claim,

1. A vehicle wheel comprising a pair of circular disk-like plates arranged in spaced relation, said plates provided with hubs to receive an axle, a ring arranged at the periphery of said plates, a second ring positioned between said plates, and separated from said first ring, each ring provided with a series of separated radially-extending apertures each aperture in one ring being in radial alinement with an aperture in the other ring, a radially-shiftable spoke having an enlarged outer end mounted in each pair of openings, an abutment on each spoke arranged inwardly of the outer ring, a tubular rubber block surrounding each spoke and positioned between said abutment and the outer face of the inner ring, a rim spaced from and encircling the outer ring, said rim provided in its inner face with a series of recesses to receive the outer ends of said spokes, a tubular block of rubber around each spoke extending between the rim and the outer ring, and an elastic tire mounted on said rim.

2. A vehicle wheel comprising a pair of circular disk-like plates arranged in spaced relation, said plates provided with hubs to receive an axle, said plates further provided on their opposing faces with two annular flanges the flanges on the two plates adapted to register to form rings in their assembled relation, said rings being spaced apart to provide an annular chamber, each ring provided with a series of separated radially-extending apertures, each aperture in one ring being in radial alinement with an aperture in the other ring, a radially shiftable spoke having an enlarged outer end mounted in each pair of openings, an abutment carried by each spoke, a tubular rubber block surrounding each spoke and positioned between said abutment and the outer face of the inner ring, a rim spaced from and encircling the outer ring, said rim provided in its inner face with a series of recesses to receive the outer ends of said spokes, a tubular block of rubber around each spoke and extending between the rim and the outer ring, and an elastic tire mounted on said rim.

In testimony whereof I have hereunto set my hand.

WARREN H. HINES.